United States Patent [19]

Perez et al.

[11] Patent Number: 5,141,091
[45] Date of Patent: Aug. 25, 1992

[54] CLUTCH CONTROL MECHANISM, IN PARTICULAR FOR MOTOR VEHICLES

[75] Inventors: Carlos L. Perez, Madrid, Spain; Michel Bacher, Andilly, France; Cecilio Martinez-Corral, Madrid, Spain

[73] Assignee: Valeo, Paris, France

[21] Appl. No.: 762,366

[22] Filed: Sep. 19, 1991

[30] Foreign Application Priority Data

Sep. 25, 1990 [FR] France .................. 90 11810

[51] Int. Cl.$^5$ ........................... F16D 23/14
[52] U.S. Cl. ...................... 192/93 A; 192/98; 192/110 B
[58] Field of Search ............ 192/93 A, 98, 94, 110 B

[56] References Cited

U.S. PATENT DOCUMENTS

| 850,854 | 4/1907 | Spencer | 192/98 X |
|---|---|---|---|
| 2,521,607 | 9/1950 | Rohn | 192/97 |
| 3,416,637 | 12/1968 | Maurice | 192/98 |
| 4,648,498 | 3/1987 | Herbulot et al. | 192/94 |
| 4,852,710 | 8/1989 | Gay et al. | 192/98 |
| 4,924,988 | 5/1990 | Page | 192/93 A X |
| 4,934,503 | 6/1990 | Bacher et al. | 192/93 A |

FOREIGN PATENT DOCUMENTS

| 405789 | 1/1910 | France . |
|---|---|---|
| 199642 | 10/1986 | France . |

Primary Examiner—Rodney H. Bonck
Assistant Examiner—Andrea Pitts
Attorney, Agent, or Firm—Longacre & White

[57] ABSTRACT

A clutch control mechanism, for manoeuvring an actuating member such as a clutch release bearing, comprises a support member, a tubular driving member, a tubular driven member having a mounting means and, between the driving member and the driven member, camming means of the helical ramp type.

The said mounting means comprises a first sleeve adapted to penetrate into the interior of the actuating member and to carry internally one of the cams, while the driving member penetrates into the interior of the sleeve and carries the other cam, the sleeve having an external radial flange, which acts as an abutment for the clutch release bearing and which is coupled in rotation to the support member.

11 Claims, 12 Drawing Sheets

CLUTCH CONTROL MECHANISM, IN PARTICULAR FOR MOTOR VEHICLES

FIELD OF THE INVENTION

This invention relates to a control mechanism for a clutch, in particular for a motor vehicle clutch, and being a control mechanism for a clutch comprising, or manoeuvring an actuating member which is arranged to act on the declutching mechanism of a clutch; a support member for securing the said control mechanism on to a fixed part; a tubular driving member, which is secured against translational movement and which is adapted to be subjected to the action of control means, the driving member being mounted for rotational movement with respect to the support member by bearing means carried by the said support member; a tubular driven member which is mounted for translational movement but secured against rotational movement with respect to the support member by anti-rotation means carried by the said support member, the said driven member being adapted to act on the actuating member; and, between the driving member and the driven member, camming means having complementary helical ramps, wherein the driven member includes a mounting means for carrying the actuating member.

BACKGROUND OF THE INVENTION

Such a mechanism is described in the specification of U.S. Pat. No. 4,934,503, and constitutes a unitary module. In that patent specification, the driven member has at its inner periphery a flange or radial plate which extends radially towards the axis of the assembly and on which the actuating member (i.e. a clutch release bearing) is mounted by means of a special ring. Such an arrangement complicates the fitting operation, because the actuating member cannot be fitted by simply threading it axially on to the driven member of the control mechanism. The driven member surrounds the clutch release bearing, so that in some cases the size of the latter is undesirably restricted. In addition, the radial size of the whole arrangement is relatively large.

DISCUSSION OF THE INVENTION

An object of the present invention is to overcome the above disadvantages, and thereby to provide a novel control mechanism having a reduced radial size, while also simplifying the fitting of the actuating member while at the same time not limiting the radial size of the latter; and also to produce further advantages.

In accordance with the invention, a control mechanism of the kind defined under the heading "Field of the Invention" above is characterised in that the mounting means includes an axially oriented first sleeve which is adapted to penetrate into the interior of the actuating member and to carry within it part of the said camming means, in that the driving member penetrates into the interior of the said sleeve and carries the other part of the said camming means, and in that the said sleeve carries an outwardly projecting first radial flange which is adapted, firstly, to act as an abutment member for the actuating member and, secondly, to be coupled in rotation to the support member through the said anti-rotation means.

The invention enables the actuating member (clutch release bearing) to be fitted by simply offering it up axially, while its size is not limited by the driven member of the mechanism. In addition, the mechanism is more compact both radially and axially. The control mechanism may thus be fitted in association with actuating members or clutch release bearings of different sizes, with the said mounting means constituting a mounting nose. The driving member is also simplified, and is lighter in weight than before, having a reduced inertia which enables the precision of the control of the mechanism to be improved, as well as its response time. The support member is also simplified. In addition, there is no obstacle inside the driving member, so that a component such as the input shaft of the gearbox of the vehicle can extend through it.

The invention also enables the sleeve of the driving member to carry sealing means for cooperation with the driving member, while the support member may consist of a rigid housing member closed by a bellows. This enables both the driving and driven members to be protected against the penetration of impurities, dirt or the like, thus increasing the useful life of the control mechanism.

The driven member may be coupled in rotation to the support member, through at least one tangential tongue, rectilinear in shape and taking advantage of the additional space which is released by the driving member. It also becomes possible to use camming means, of the helical ramp type, which include a recirculating series of balls coupling the driving and driven members together. Finally, these camming means may be constructed in many ways, as may the bearing means.

The description given below, of a number of preferred embodiments of the invention, is by way of example only and with reference to the accompanying drawings.

DESCRIPTION OF PREFERRED EMBODIMENTS OF THE INVENTION

Figure 1:
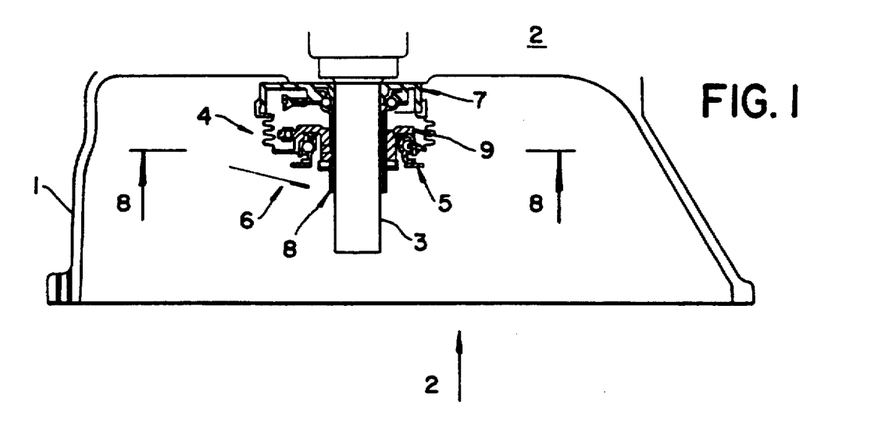
FIG. 1 is a view in cross section showing the control mechanism in a first embodiment of the invention, mounted on the gearbox of a motor vehicle.

Referring first to FIG. 1, this shows a control mechanism 4 for a motor vehicle clutch. The control mechanism 4 is adapted to manoeuvre an actuating member 5 which is arranged to act on a declutching element, in the form of a diaphragm 6, of the clutch. The control mechanism 4 includes a support member 7, a tubular driving member 8, and a tubular driven member 9.

In this example, the actuating member 5 is in the form of a clutch release bearing which is arranged to act on the ends of the diaphragm 6 which is part of the declutching mechanism of the clutch itself. In a modification, this declutching mechanism may include declutching levers and helical springs, with the clutch release bearing 5 acting on these levers. The support member includes a housing 7, of a suitable plastics material, having a base 70 (FIG. 7) which is provided with two fastening ears 78 and 78'. Each fastening ear 78, 78' has a hole, 77, 77' respectively, through which pass fastening screws for securing the housing 7 to an external fixed structure, which here consists of the gearbox indicated at 2 in FIG. 1.

Figure 7:
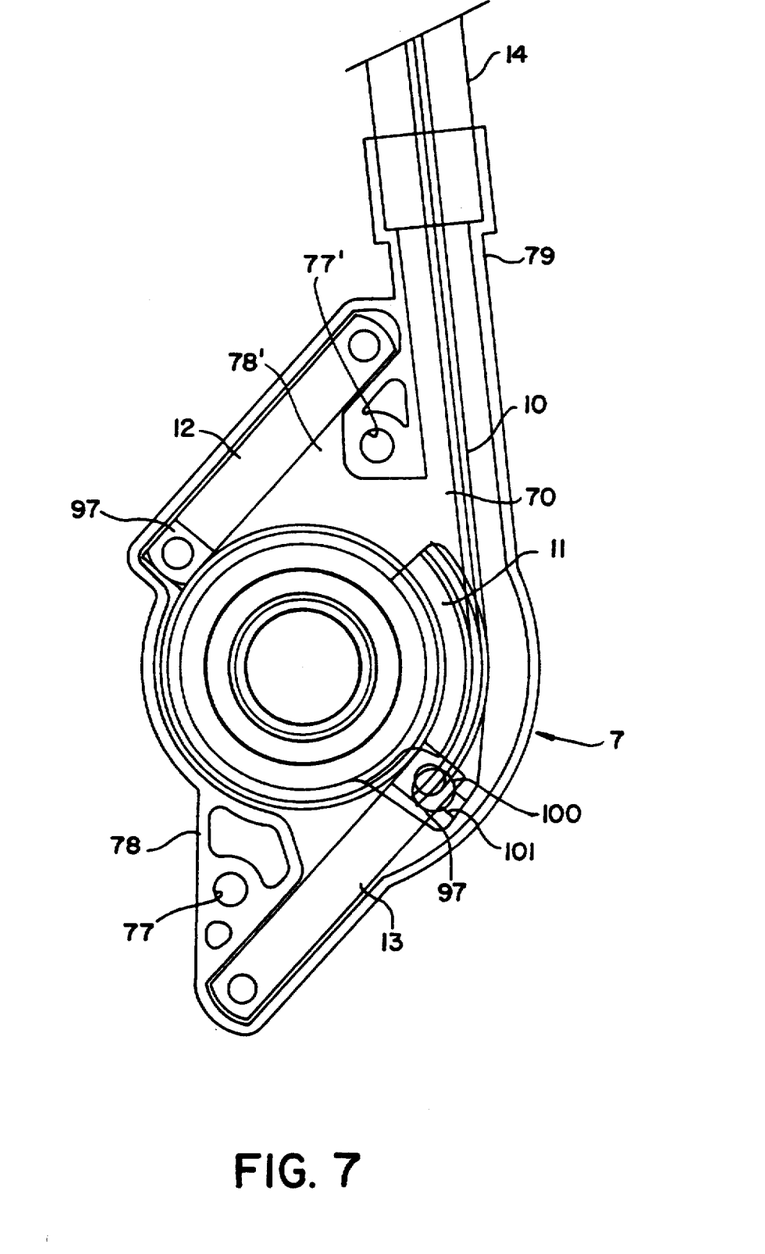
FIG. 7 is a front view, as seen in the direction of the arrow 2 in FIG. 1, showing the support member but without its bellows.

Still referring to FIG. 1, the gearbox 2 has a gearbox casing 1, and a primary driven shaft 3 which extends into the interior of the tubular driving member 8. The latter is arranged to be controlled by the action of appropriate control means, which in this example comprise a Bowden cable 10 (see FIG. 4 and 7) having a guide sheath 14, FIG. 7. FIG. 7 also shows a tubular portion or tunnel 79 which is part of the housing 7. The cable 10 extends into the tunnel 79, with the end of its sheath 14 being mounted against a shoulder formed within the tunnel 79 for this purpose. The driven member 8 is retained against translational movement, and has an actuating portion 11 in the form of a radially oriented segment. The cable 10 is wound on to the actuating segment 11, and the latter has a generally circumferential groove. A ferrule 100 is secured on the free end of the cable 10, as described in the specification of U.S. Pat. No. 4,934,503, and is lodged in the end of this groove in the actuating segment 11, which also has a radial groove 101 for engagement with the ferrule 100.

Figure 4:
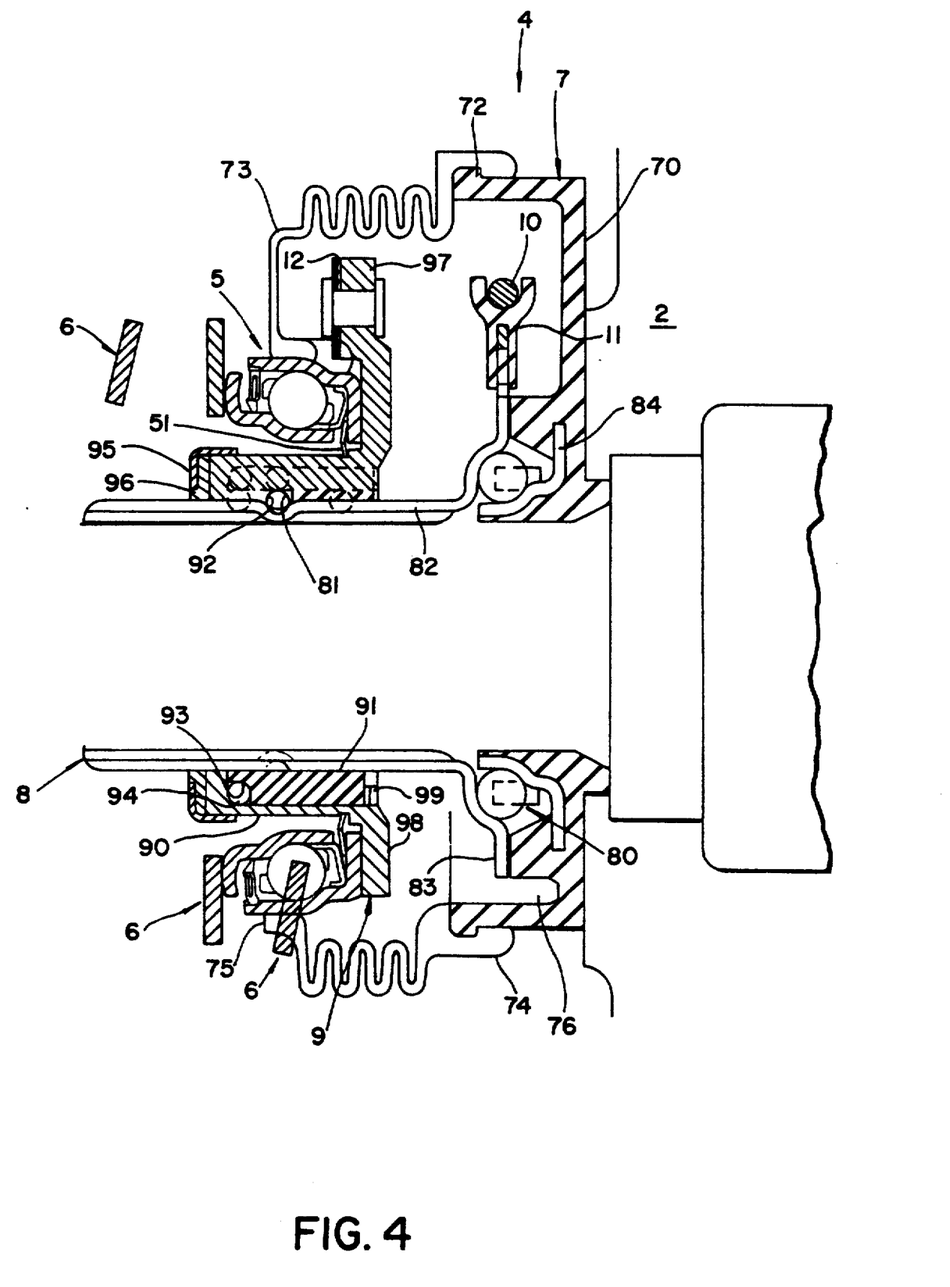
FIG. 4 is a view in axial cross section and on a larger scale, showing the same control mechanism as FIG. 1.

The tubular driving member 8 is mounted so as to be rotatable with respect to the support member 7, through bearing means 80, FIG. 4, carried by the latter. The tubular driving member 8 is, by contrast secured against rotation but arranged to be movable in translational movement with respect to the support member 7. It is prevented from rotating by anti-rotation means 12, 13 (FIG. 7) which are carried by the support member 7. The driven member 9 is arranged to act on the actuating member 5. Camming means 92, 81, 94, having complementary helical ramps, provide a coupling between the driving member 8 and the driven member 9.

The driven member 9 includes a mounting means 90, 98 for carrying the clutch release bearing 5. The mounting means comprise a first sleeve 90, axially oriented and extending within the clutch release bearing 5. Part of the camming means 81, 92, 94 are carried internally by the first sleeve 90. The driving member 8 extends within the sleeve 90, and carries the other part of the camming means. The sleeve 90 is joined to an externally projecting transverse first radial flange 98, which is arranged to act as an axial abutment for the clutch release bearing 5, and which is also arranged to be coupled in rotation to the support member 7 through the anti-rotation means 12, 13.

The first flange 98 thus extends radially away from the axis of the assembly, while the mounting means 90, 98 of the driven member 9 together constitute a mounting nose for the clutch release bearing. The driving member 8 surrounds the primary driven shaft 3 of the gearbox with a slight radial clearance, with this shaft passing axially through it. The bore of the driving member 8 is thus dependent on the diameter of the shaft 3.

Reference is now made to FIG. 4, 5, 6 and 11 to 15. In these Figures, the annular mounting means 90, 98 is seen to have, in axial cross section, a shape which is generally that of an inverted L. The first flange 98 is integral with the axially oriented sleeve 90 (see FIG. 4), and carries two lugs 97 which project from its outer periphery in positions diametrically opposed to each other.

Figures 2, 3:
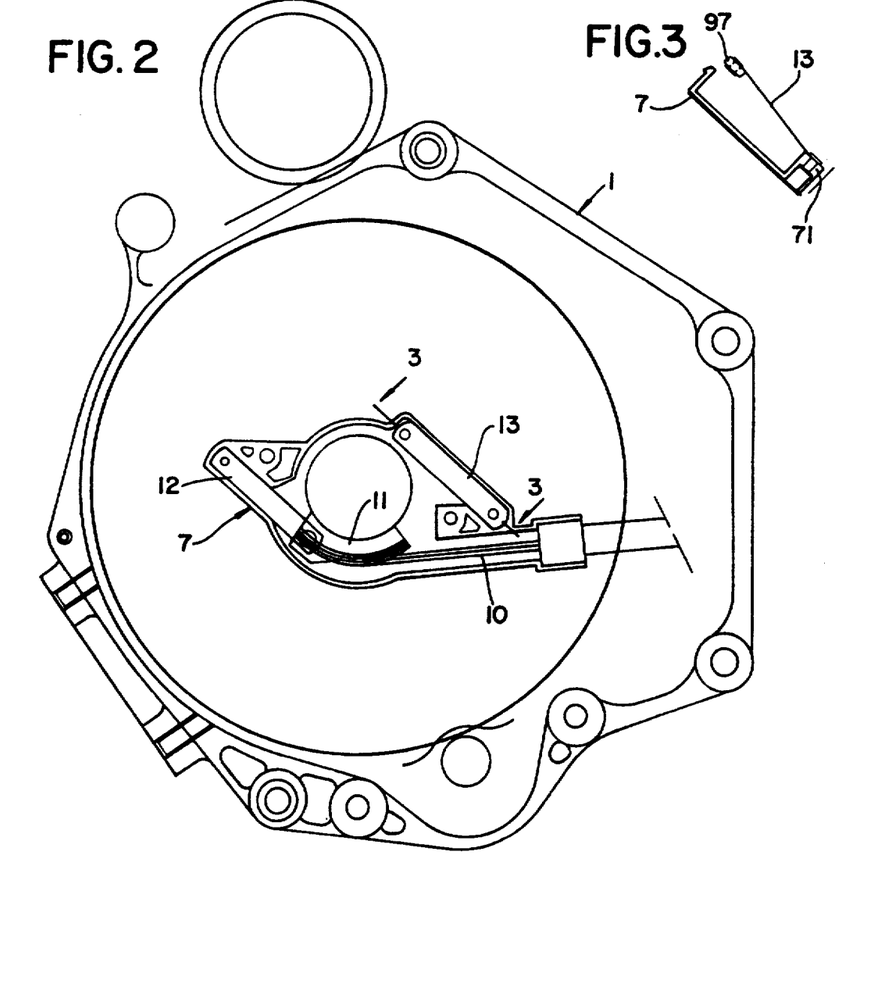
FIG. 2 is a view seen from the direction of the arrow 2 in FIG. 1.
FIG. 3 is a scrap view, seen in cross section taken on the line 3—3 in FIG. 2.
Figure 8:
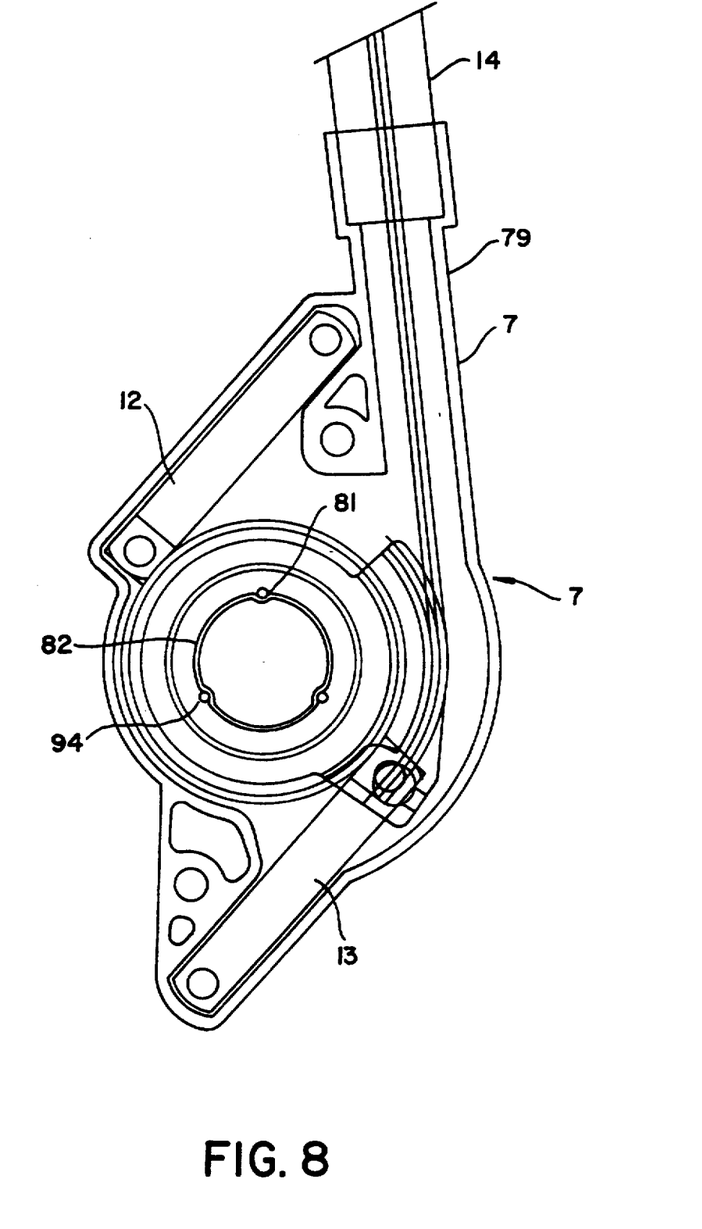
FIG. 8 is a view in cross section taken on the line 8—8 in FIG. 1.

The anti-rotation means are in the form of at least two tangentially oriented tongues 12 and 13 which act in conjunction with each other, and as can be seen in FIGS. 2, 7 and 8, they are secured by means of the lugs 97. The tongues 12 and 13 are rectilinear, not curved like those disclosed in the specification of U.S. Pat. No. 4,934,503. Each tongue 12, 13 is secured at each of its ends, in this example by riveting, respectively to one of the lugs 97 and to a respective one of two anchor pins 71 (see in FIG. 3) carried by the housing 7. It will of course be understood that the tongues 12 and 13 may alternatively be secured by threaded fasteners or other similar suitable means. The tongues 12 and 13 are resilient, and extend in opposite directions parallel to each other, at right angles to, and on either side of, a diameter passing through the lugs 97. The anchor pins 71 are formed in the ears 78 and 78', which are grooved so as to accommodate the tongues 12 and 13 respectively. This arrangement is made possible in particular by the fact that the driving member 8 penetrates into the interior of the first sleeve 90. Accordingly, the driven member 9 is fixed against rotation, and the tongues 12 and 13 work under excellent conditions and are of substantial length, which enables them to exert a precise reaction force.

In FIG. 4, the lugs 97 are slightly offset axially with respect to the main part of the flange 98. In this example, there is only one tongue 12, and only one tongue 13, but it should be understood that it is possible to provide at least one additional tongue at each of the positions in which the single tongues 12 and 13 are shown in the drawings. As can be seen in FIG. 3, the tongues are in fact inclined axially, and they exert a reaction force axially towards the base 70 of the support member 7. The tongues 12 and 13 also return the driving member, through the camming means with their complementary helical ramps, axially towards the base 70. The driving member 8 is thus secured against translational movement under all circumstances.

Carried inside the sleeve 90 is a ring 91, which in this example is of a plastics material having a low coefficient of friction. The thickness of the ring 91 is not constant and it is formed with three grooves 93. The ring 91 is retained in the sleeve 90 by a retaining element 99, FIG. 4, formed by upsetting the material of the sleeve 90. The ring 91 is thus trapped between the shoulder defined by the retaining element 99 and a radial flange which is directed towards the axis of the assembly and which is part of the sleeve 90 at its end axially opposite that which has the flange 98.

The ring 91 also has three helical ramp portions. Similarly, the first sleeve 90 has three helical ramp portions 92' (see FIG. 9) complementary to the ring 91. The ramp portions 92' of the sleeve 90 are offset axially with respect to each other. The ring 90 also has three grooves 92. Thus there is defined, between the ring 91 and sleeve 90, a circulation channel for a set of balls 94, which are seen in FIG. 4. The arrangement is seen more clearly in the developed views of FIGS. 9 and 10. In this way, the first sleeve 90 with its ring 91 and the balls 94, together form a sleeve nut.

The driven member 9 itself is in the form of a threaded tube, having a helical thread 81 defined on the concave side of a bead and conforming to the shape of the balls 94. The thread 81 is formed in this example in three parts, which are offset axially from each other.

Figure 9:
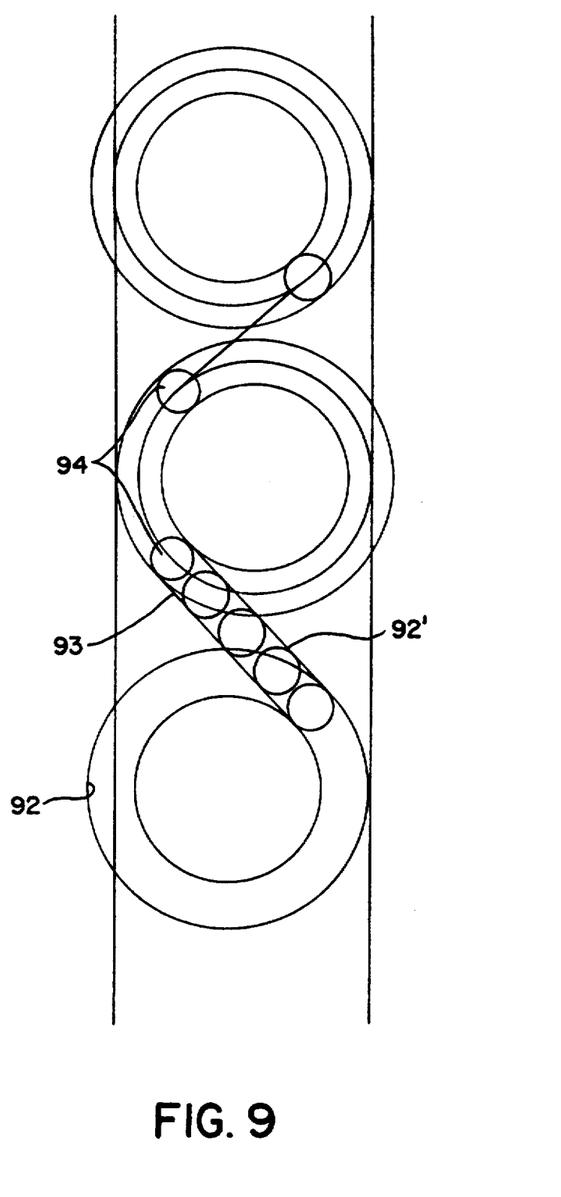
FIG. 9 and 10 are developed views diagrammatically showing the ball recirculation system seen in FIG. 4.
Figure 10:
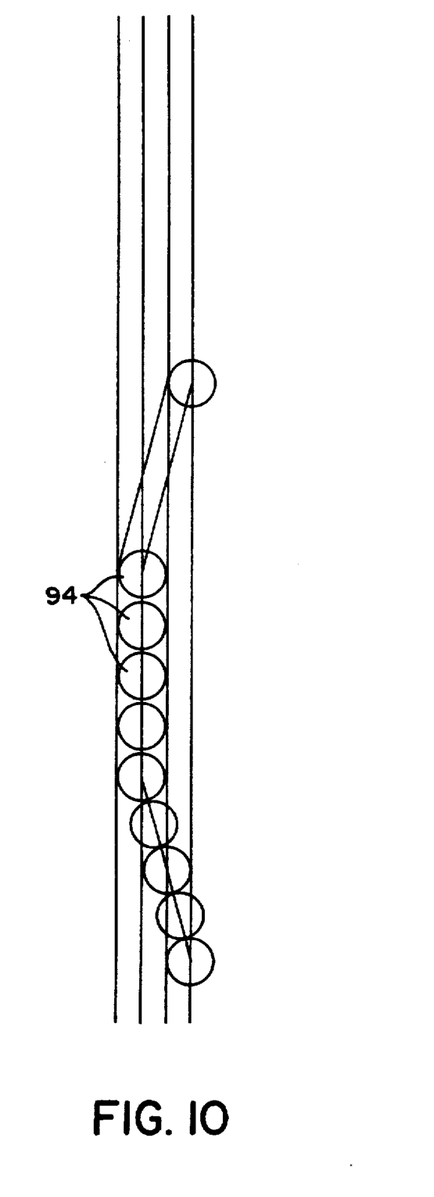

As will be understood from the foregoing, a recirculation means for the balls 94 is thus provided. With reference to FIGS. 9 and 10, the balls 94 cooperate with the helical thread 81, with the helical ramp portions 92' of the sleeve 90, and with the helical ramp portions of the ring 91, being then transferred into the return portions 92, 93 for their recirculation. It is thus possible to provide a very large number of balls, which is conducive to the effective driving of the driven member 9 by the driving member 8. The tubular driving member 8, like the mounting means 90, 98 of the driven member, has a cross section in the general form of an inverted L, with an axially oriented sleeve portion 82 which will be referred to here for convenience as the second sleeve. This second sleeve carries part of the camming means, namely the helical ramp or thread portions 81. The second sleeve 82 is joined to a generally transversely extending portion 83 of the member 8, which will be referred to here for convenience as the second radial flange. The second radial flange 83 is so shaped as to cooperate with the bearing means 80 and also to carry the actuating portion, i.e. the actuating segment 11. In this example, the bearing means 80 are in the form of a ball bearing of the oblique contact type, in which the forces involved have both radial and axial components. The actuating segment 11 is, in this embodiment, moulded on to the second flange 83.

The inner ring 84 of the bearing 80 is nested within a portion 76 of increased thickness which projects from the base 70 of the housing 7, while the outer ring of the bearing is formed in the flange 83. It will be noted that, for the purpose of sealing the bearing 80, a narrow radial passage is provided between the outer periphery of the second flange 83 and the projection 76, and that the driving member, and therefore the first sleeve 90 with its flange 98, can be made of pressed sheet metal. The housing 7 is simplified and has no internal sleeve. The segment 11 is cantilevered on the second flange 83, being parallel with the first flange 98. As can be best seen in FIG. 4, the second flange 83 extends within the segment 11 radially outwardly of the outer periphery of the lugs 97, the flanges 83 and 98 being parallel to each other and extending radially away from the axis of the assembly.

The sleeve 90 carries at its free end (i.e. that opposite the flange 98) a sealing ring 96 (FIG. 4), which is retained on the sleeve 90 by means of a retaining ring 95 of angle section, force-fitted on the outer periphery of the sleeve 90. The seal retaining ring 95 enables the seal 96 to be retained in position in such a way as to cooperate sealingly with the second sleeve 82 that passes through it. Perfect sealing is thus obtained at this point.

The actuating member 5, which as mentioned above is a clutch release bearing, is in this example of the kind described in the specification of U.S. Pat. No. 4,852,710. This release bearing comprises a rotating internal ring which is profiled for cooperation with the fingers of the diaphragm 6, together with a non-rotating outer ring having a radial flange which is directed towards the axis of the assembly, and which is adapted to cooperate with the first flange 98. An axially acting resilient ring 51 mounted in the gap between the inner ring of the release bearing 5 and the radial flange of its outer ring. The resilient ring 51 is of dihedral shape, and has at least one tab by means of which it is adapted to bear against a shoulder defined in a circumferential groove (FIG. 4) formed on the sleeve 90, so as to bias the radial flange of the non-rotating outer ring of the release bearing 5 towards the first radial flange 98.

Reference is invited to the above mentioned U.S. Pat. No. 4,852,710 for more details of this arrangement, bearing in mind that assembly can be carried out by simple axial threading of the clutch release bearing 5 on to the sleeve 90, in a direction away from the base 70 of the housing member 7, so as to form a mounting nose. Thus in this example, the clutch release bearing is of the retained, auto-centring kind. It is of course equally possible to use alternative arrangements, such as that having a rotating outer ring as described in the specification of U.S. Pat. No. 3,416,637 (see in particular FIGS. 2 and 3), and in the specification of U.S. Pat. No. 4,852,710 (see FIG. 7). The mounting means may thus be formed with a U-shaped cross section as in FIG. 7 of the last mentioned United States patent. In a modification, the inner ring of the release bearing may be fixed and be force-fitted on to the sleeve 90, which then has a recess for accommodating the retaining ring 95, with the outer ring of the release bearing being rotatable. Regardless of the foregoing, in all cases the fitting of the clutch release bearing 5 is simplified by comparison with the arrangements described in U.S Pat. No. 4,934,503, and may be carried out by a simple axial threading action. In addition, several sizes of clutch release bearing may be mounted on the mounting means of the driven member 9.

The support housing 7, having its base 70 in which the ears 78 and 78' are formed, and having also a peripheral flange, axially oriented and extending away from the gearbox 2, is preferably closed by means of a bellows 73 (see FIG. 4). Space extending both axially and radially is available within the bellows 73. For this purpose, the free end of the peripheral flange of the housing member 7 is formed with a lip 72, on which the end 74 of the bellows 73, formed with a groove to mate with the lip 72, is fitted. The bellows 73 extend radially ouside the first radial flange 98 and lugs 97, and has an outwardly turned radial end portion 75, extending axially for cooperation with the outer peripheral of the non-rotating outer ring of the clutch release bearing 5. In the alternative arrangement in which this outer ring is rotatable, the end portion 75 of the bellows then cooperates with the outer periphery of the first radial flange 98, or an axially extending annular flange portion which is fixed with respect to the flange 98.

It will be noted that the two end portions 74 and 75 of the bellows extend parallel to each other, but that they are offset radially from each other, and that the housing 7 encloses the actuating segment 11 and the associated cable 10. It will also be appreciated that the control mechanism 4 constitutes a unitary assembly which is well protected against penetration of impurities, dirt or the like into its interior.

FIG. 4 shows the various configurations which are assumed by the diaphragm 6 at different times. In this connection, it is assumed that the clutch (which is not shown) is of the "pushed" type, and that it is therefore necessary to exert a pushing force or thrust, by means of the actuating member consisting of the clutch release bearing 5, on the ends of the fingers of the diaphragm 6 so as to release the grip on the clutch lining carried by the friction disc of the clutch, these linings being normally gripped between the pressure plate and reaction plate of the clutch.

In order to release the clutch, all that is thus necessary is to actuate the driving member 8, which is of light construction, in rotational movement by means of the cable 10, so that the driven member 9 is displaced axially (i.e. in translational movement) by the helical ramp type camming means. The driven member 9 then acts in a thrust mode on the diaphragm 6.

Figure 5:
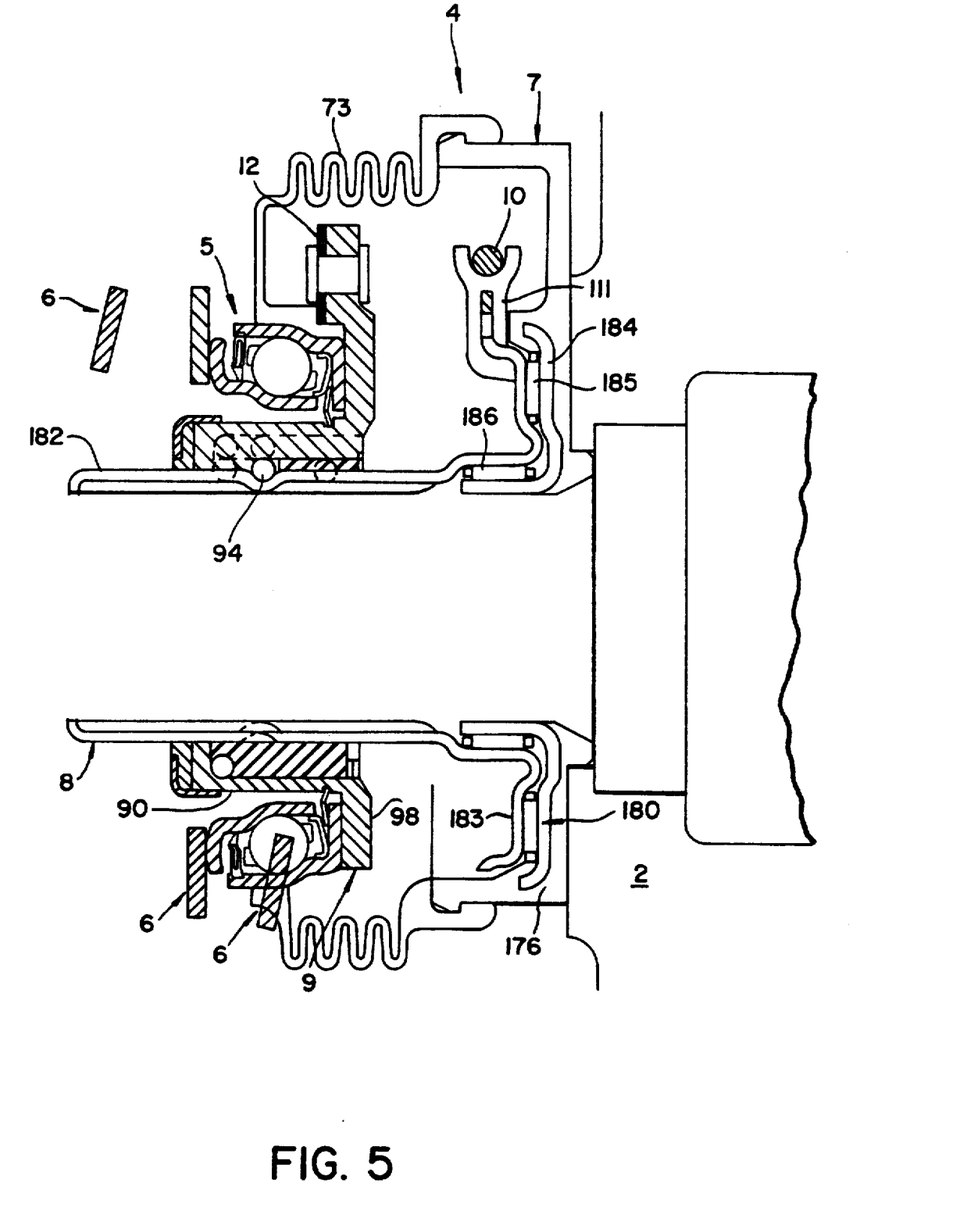
FIG. 5 is a view similar to FIG. 4, but showing a control mechanism in a second embodiment of the invention.

It will be appreciated that the inertia of the mechanism described above is reduced, and that in addition, axial space is made available between the first flange 98 and the second flange 83. In this connection, reference is now made to FIG. 5 showing a second embodiment of the control mechanism in accordance with the invention. In FIG. 5, certain of the components are denoted by reference numerals in which 100 is added to the numeral used in FIGS. 1 to 4.

In FIG. 5, the bearing means 180 consist of two needle bearings 185 and 186, each having a set of needle rollers. The bearing 185 takes axial loads, while the bearing 186 takes the radial loads. In this case, the common inner bearing ring 184 of these two bearings, which is anchored within the thickness 176 of the support member 7, is so shaped as to provide rolling paths for the sets of needle rollers 185 and 186. Similarly, the second radial flange 183 and the second sleeve 182 are so shaped as to receive respectively the needles 185 and 186, so as to act as the other ring of both bearings. The second flange 183 is thus in serpentine form, with an outer end which is offset axially away from the base 70 of the housing 7, so that the actuating element 111, acting as a guide for the cable 10, is cantilevered from the second flange 83. This arrangement removes the need to rely on a tongue 12 or 13 for retaining the driven member 9 against rotation. This tongue is then able to be an extension of the cable 10 and the tunnel 79 (FIG. 7), according to the space available.

Figure 6:
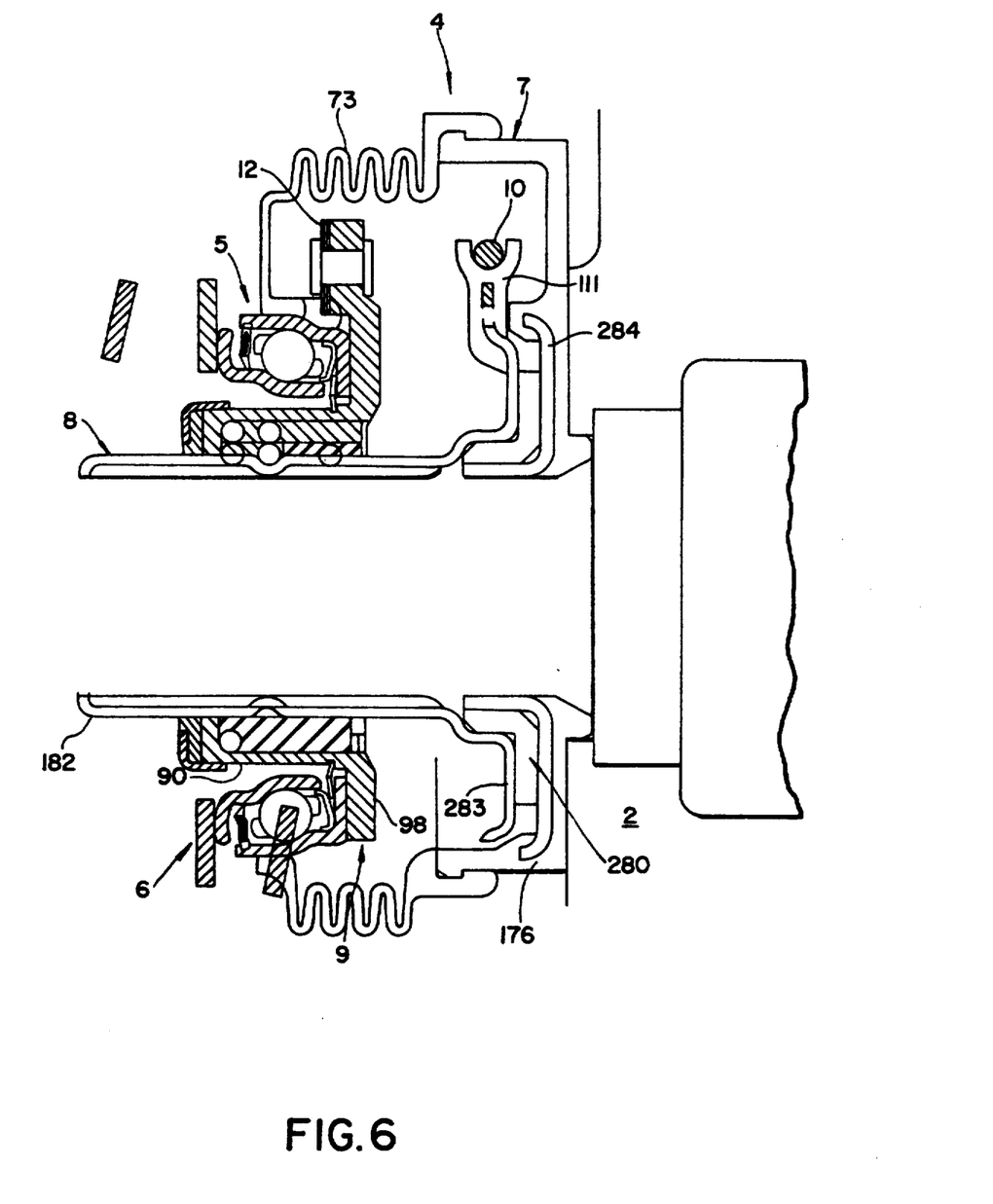
FIG. 6 is a view similar to FIG. 4, but showing a control mechanism in a third embodiment of the invention.

Referring now to FIG. 6, in this third embodiment of the clutch control mechanism, instead of providing two rolling bearings, these may be replaced by a single bearing 280, of a suitable anti-friction material, annular in shape and having a cross section which is generally in the form of an inverted L. The bearing 280 is mounted between a member 284, anchored in the support member 7, and the second radial flange (which is here denoted by the reference numeral 283).

The invention opens up a large number of possibilities as regards the complementary helical ramp type camming means. Thus, and referring to the further embodiment shown in FIG. 11, these camming means here consist of helical projections 192 which are offset axially from each other and which are carried by a member 191 fixed with respect to the first sleeve (here denoted by the reference numeral 190). The driven member 9 has complementary helical grooves 181 for cooperation with the projections 192. The member 191 is made of a suitable anti-friction material such as a plastics material, moulded on to the first sleeve 190, which thus forms a two-material or compound sleeve nut, while the second sleeve (here denoted by the reference numeral 282) of the driving member 8 constitutes a threaded tube for receiving the projections 192, the latter being trapezoidal in cross section. Thus, in FIG. 11 there are several projections 192 and complementary grooves 181 as in FIG. 4, but it is of course possible to provide only one single projection and one single groove, following the helix angle.

Figure 12:
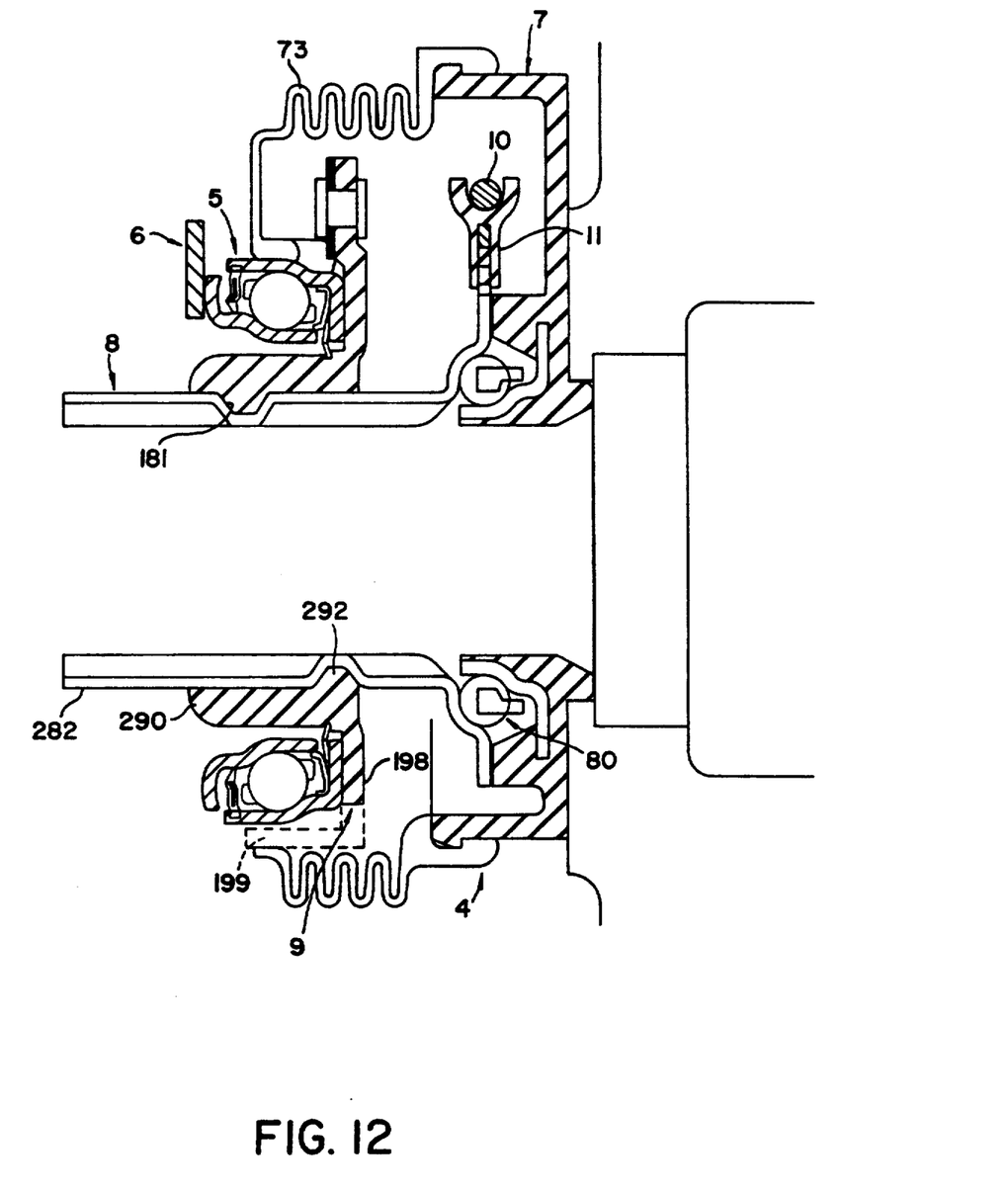

Referring now to FIG. 12, the first sleeve nut, 290, is of plastics material having a low coefficient of friction, and this sleeve nut includes the projections 292 which are engaged at all times in complementary grooves 181 formed in the driving member 8, the latter being of metal.

Figure 13:
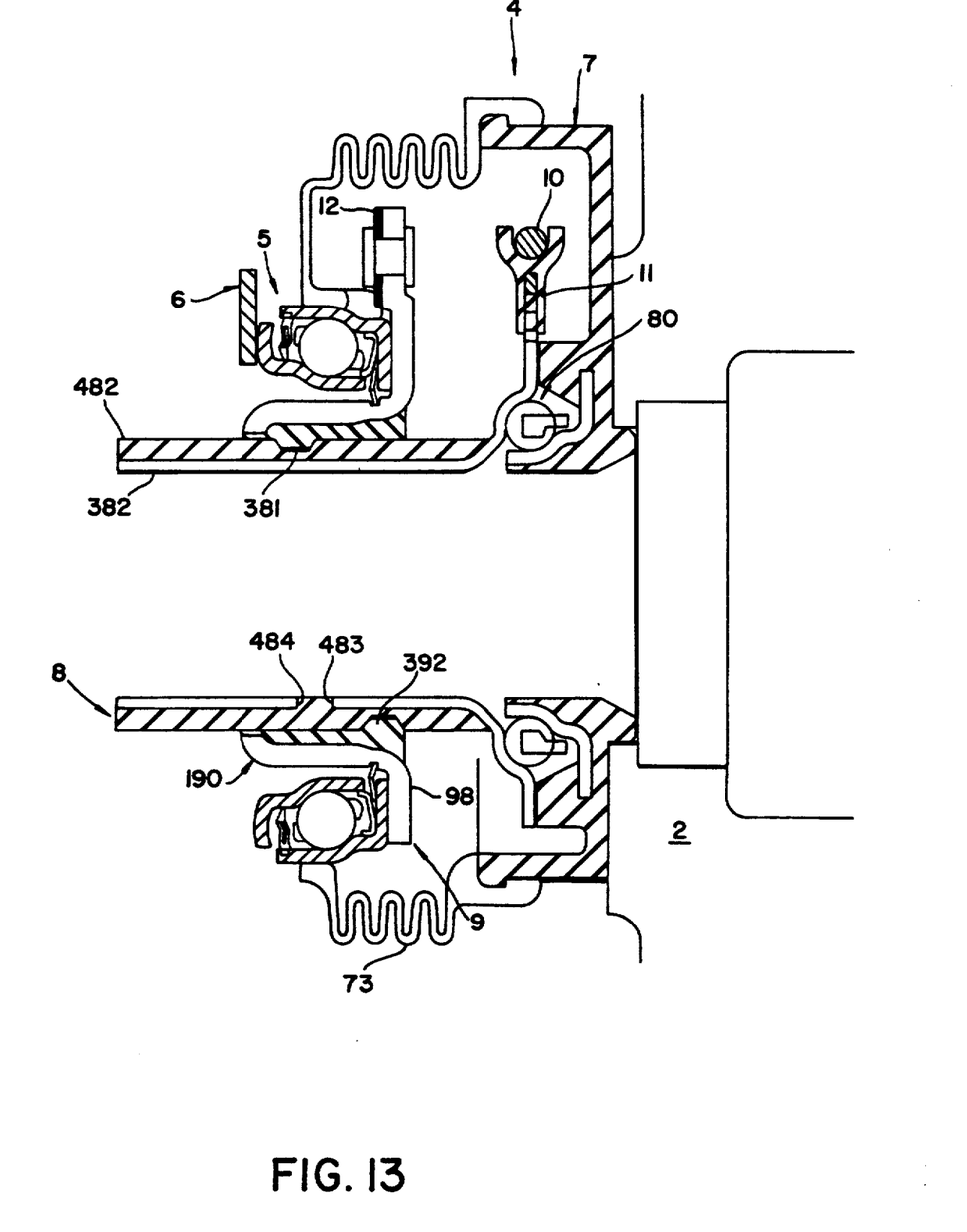

In FIG. 13, the second sleeve, 382, is of metal and carries a ring 482 of a plastics material having a low coefficient of friction, in which helical grooves 381, corresponding in function to the helical thread 81 in FIG. 4, are formed. The first sleeve, 190, then carries, as in FIG. 11, a member made of a plastics material having a low coefficient of friction and provided with projections 392 which are arranged to cooperate with the grooves 381. The ring 482 carries bosses 483, which are engaged in holes 484 formed in the sleeve 382 so as to retain the latter in position.

Figure 11:
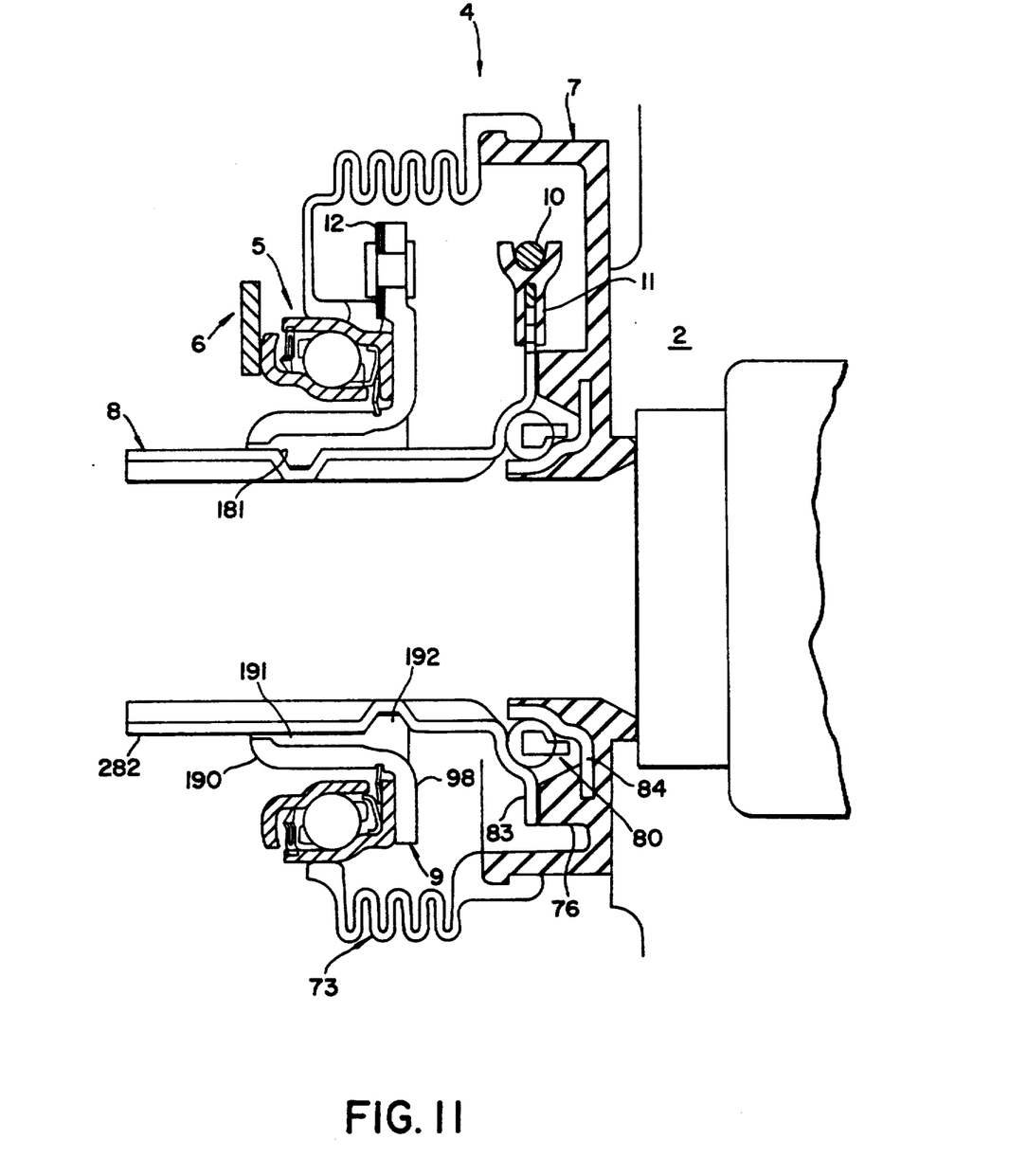
FIGS. 11 to 14 are similar to FIG. 4, but show control mechanisms in, respectively, a fourth, a fifth, a sixth, and a seventh embodiment of the invention.
Figure 14:
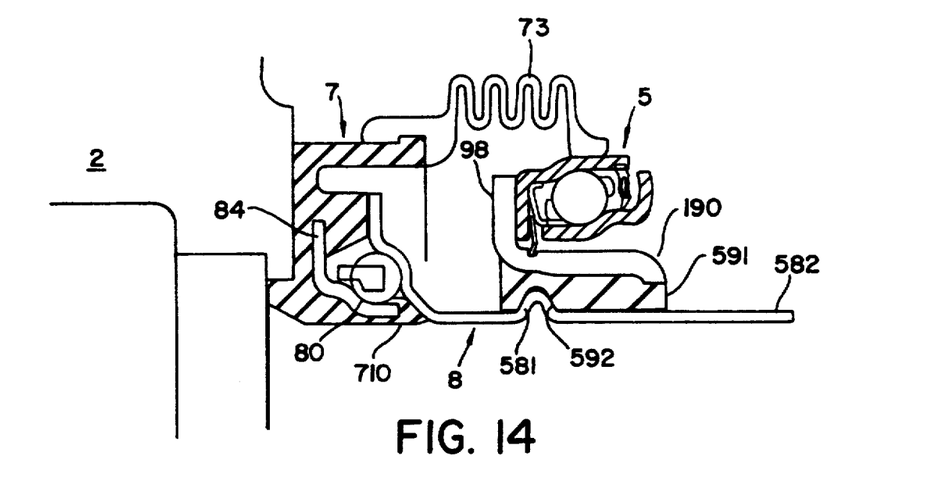

In further modification shown in FIG. 14, the structures are inverted as compared with FIG. 11. In FIG. 14, the second sleeve, 582, carries projections 581 which are offset axially from each other and which are in the form of helical ramps arranged to engage in complementary grooves 592 carried by a ring 591. The ring 591 is fixed to the first sleeve 190. With this arrangement, a plurality of grooves 592 and projections 591 are shown in FIG. 14. It is however possible, according to the value of the helix angle, to provide only a single projection with a single groove.

The present invention is of course not limited to the various embodiments described above. For example, instead of a central cable 10, an arrangement similar to that shown in FIG. 11 of the above mentioned specification of U.S. Pat. No. 4,934,503 may be provided. In that arrangement, the control cable is replaced by a rod which is displaced under the control of a hydraulic actuator and which acts on the first radial flange. In a modification, an electric motor may be used, driving the driving member of the control mechanism through a meshing coupling means.

The first radial flange may have two tenons, each of which is arranged to engage in a groove of the actuating element 11, so as to couple these two components together in rotation.

Although in FIG. 4 there is also a narrow passage between the member 84 and the second sleeve 82, for sealing the bearing 80, it is possible to provide (as is in fact shown in FIG. 14) a sealing ring 710 between the member 84 and the second sleeve, 582. The mounting means may have a U-shaped cross section, especially when it is made of a plastics material. This is illustrated in FIG. 12 in broken lines. In that case, the first radial flange 198 has at its outer periphery an axial return portion 199 which surrounds the outer ring of the clutch release bearing 5. The bellows 73 then cooperates with this return portion or flange 199.

Figure 15:
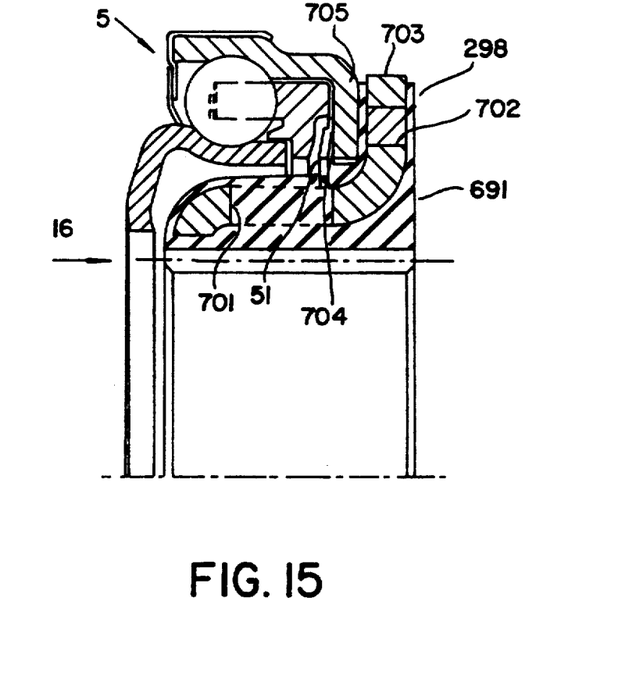
FIG. 15 is scrap view seen in axial cross section, showing one half of the mounting means of the driven member, carrying a clutch release bearing, in an eighth embodiment of the control mechanism according to the invention.
Figure 16:
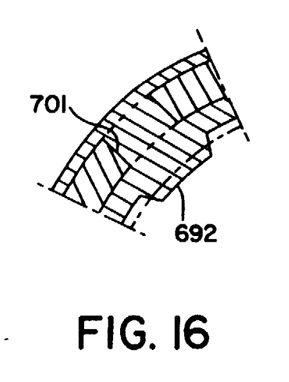
FIG. 16 is a scrap view in cross section, seen in the direction of the arrow 16 in FIG. 15.
Figure 17:
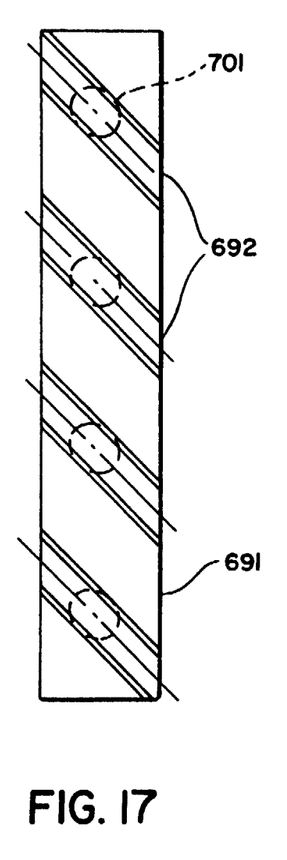
FIG. 17 is a developed view of the sleeve seen in FIG. 15.

The mounting means for the clutch release bearing, comprised in the driven member of the control mechanism, may be of compound form as in FIG. 11 but with a metallic tubular portion 703 as is shown in FIG. 15. Here the portion 703 has a cross section in the form of an inverted L, nested within a tubular portion 691 of plastics material. The portion 703 thus includes at one of its axial ends a transverse flange which is nested within a transverse part of the portion 691, the latter also having a cross section in the form of an inverted L matching that of the portion 703. To this end (see FIGS. 15 to 17), communication channels 701 and 702 are formed in the axial and radial portions, respectively, of the portion 703. The plastics material thus extends across the metal portion 703 so as to encapsulate the latter. In this way, the metal portion, by contrast with the embodiment shown in FIG. 11, does not need to be machined in order to form the groove, 704, in which is fitted the ring 51 which biases the radial flange 705 of the outer ring of the clutch release bearing 5 into contact with the first flange 298. The latter is coated with plastics material. The projections 692 are formed just as easily. In this example, four projections 692, which are offset axially with respect to each other, are provided, with each projection 692 being in the form of a helix of trapezoidal cross section, so as to define part of the camming means in the form of helical ramps. By virtue of this arrangement, the radial flange 705 is in contact with the plastics material, and there is no need to form the groove in the metal portion, while the projections are of plastics material.

The first radial flange 98 may be a separate component, applied for example by moulding, welding, or crimping on to the first sleeve, instead of being integral with the latter as in the various Figures of the drawings. In this way, the first sleeve 90 can be of a synthetic material, with the first radial flange 98 being of metal and being cast on to the first sleeve 90.

Finally, the tongues 12 and 13 may extend on the same side of the line which connects the lugs 97 together.

What is claimed is:

1. A clutch control mechanism for a clutch having a declutching element, comprising a support member for securing to an external fixed structure and, carried by said support member; control means for the mechanism; a tubular driving member; a tubular driven member; an actuating member for acting on said declutching element of the clutch; means locating said driving member against axial movement with respect to said support member; bearing means mounting said driving member for rotational movement with respect to said support member; means mounting said driven member in said support member for axial movement therein; anti-rotation means mounting said driven member for preventing rotation of the latter with respect to said support member; and camming means having complementary helical ramps and coupling said driving and driven members together, said driven member being associated with said actuating member whereby to act on the latter when driven through said camming means by said driving member in response to operation of said control means, wherein said driven member includes a mounting means carrying said actuating member, said mounting means comprising an axially extending first sleeve extending into an interior of said actuating member and carrying part of said camming means, with said driving member penetrating into an interior of said first sleeve and carrying another part of said camming means, and wherein the mechanism further comprises a first radial flange projecting externally from said first sleeve for acting as an abutment for said actuating member and being coupled to said support member through said anti-rotation means.

2. A mechanism according to claim 1, wherein the anti-rotation means comprise at least two conjugate, rectilinear tongues extending parallel to each other, with said first radial flange having two securing lugs of said support member having two anchor pins, each of said tongues being secured to one of said securing lugs and anchor pins.

3. A mechanism according to claim 2, wherein said two said securing lugs are diametrically opposed to each other, to define a diametral plane of symmetry, with said two tongues extending in opposite directions with respect to said plane of symmetry, and said support member being formed with two fastening ears for securing said support member to said fixed structure, with each said ear having a groove to accommodate a corresponding one of said tongues.

4. A mechanism according to claim 1, wherein a cross sectional shape of said driving member is substantially that of an inverted L, said driving member comprising an axially extending second sleeve penetrating into the interior of said first sleeve and carrying part of said camming means, and a second radial flange which is shaped for cooperation with said bearing means and which is coupled with said control means.

5. A mechanism according to claim 4, wherein said first sleeve has a free end opposite said first radial flange, the mechanism further comprising sealing means carried on said free end of said first sleeve and cooperating sealingly with said second sleeve.

6. A mechanism according to claim 1, wherein said camming means include a recirculating ring carried by said first sleeve, and a plurality of balls mounted in said recirculating ring, whereby to constitute a recirculating ball coupling.

7. A mechanism according to claim 6, wherein said driving member has helical grooves for circulation of said balls.

8. A mechanism according to claim 1, wherein said camming means include at least one helical projection fixed to said first sleeve, and at least one complementary helical groove carried by said second sleeve.

9. A mechanism according to claim 1, wherein said camming means include at least one helical groove carried by said first sleeve and at least one complementary helical projection carried by said second sleeve.

10. A mechanism according to claim 1, further comprising an axially acting resilient ring carried by said actuating member, the latter having a radial flange, whereby said resilient ring biases said radial flange into contact with said first radial flange of said driven member of the mechanism, said first sleeve having a groove in which said resilient ring engages, and said support member comprising a housing, a bellows closing said housing, and means securing said bellows on said housing and on said actuating member.

11. A mechanism according to claim 1, wherein said mounting means includes a first tubular portion and a second tubular portion encapsulated in said first tubular portion, said tubular portions having matching cross sectional shapes in the form of an inverted L and being of plastics material and metal respectively, with said first tubular portion carrying part of said camming means and said second tubular portion having communication channels formed in both its axial and radial parts.

* * * * *